US008953082B2

(12) United States Patent
Shimotono et al.

(10) Patent No.: US 8,953,082 B2
(45) Date of Patent: Feb. 10, 2015

(54) METHOD IN WHICH CAMERA MODULE TRANSFERS IMAGE DATA AND COMPUTER THEREFOR

(75) Inventors: Susumu Shimotono, Hadano (JP); Jun Sugiyama, Yokohama (JP); Hideki Kashiyama, Yokohama (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 50 days.

(21) Appl. No.: 13/608,986

(22) Filed: Sep. 10, 2012

(65) Prior Publication Data

US 2013/0063607 A1   Mar. 14, 2013

(30) Foreign Application Priority Data

Sep. 9, 2011   (JP) ................ 2011-196887

(51) Int. Cl.
*H04N 5/222*    (2006.01)
*G06F 1/32*    (2006.01)
*H04N 5/232*    (2006.01)
*H04N 17/00*    (2006.01)

(52) U.S. Cl.
CPC ............... *G06F 1/325* (2013.01); *H04N 5/232* (2013.01); *H04N 5/23241* (2013.01); *H04N 17/002* (2013.01); *Y02B 60/32* (2013.01)
USPC .................................. 348/333.13

(58) Field of Classification Search
CPC . H04N 17/002; H04N 5/232; H04N 5/23241; H04N 5/225; G06F 1/325; H05N 5/222
USPC ...................... 348/207.11, 207.1, 333.13, 372
See application file for complete search history.

(56) References Cited

U.S. PATENT DOCUMENTS

| 6,661,462 | B2 * | 12/2003 | Ohnogi ..................... 348/372 |
| 2006/0170779 | A1 * | 8/2006 | Tanabe ................... 348/207.99 |
| 2008/0284855 | A1 * | 11/2008 | Umeyama et al. ......... 348/207.1 |
| 2009/0256917 | A1 * | 10/2009 | Lin et al. ................. 348/207.11 |
| 2010/0141791 | A1 | 6/2010 | Fujiwara |
| 2010/0157067 | A1 * | 6/2010 | Karn et al. ................ 348/207.1 |

FOREIGN PATENT DOCUMENTS

| CN | 1953514 | 4/2007 |
| JP | 2004-120595 | 4/2004 |
| JP | 2004-186743 | 7/2004 |
| JP | 2005-167634 | 6/2005 |
| JP | 2007-279425 | 10/2007 |
| JP | 2008-187536 | 8/2008 |

OTHER PUBLICATIONS

Kris Fleming, "Power saving of using USB Selective Suspend Support Whitepaper", Intel Mobile Platforms Group, May 20, 2003.
(Continued)

*Primary Examiner* — Aung S Moe
*Assistant Examiner* — Amy Hsu
(74) *Attorney, Agent, or Firm* — Kunzler Law Group

(57) ABSTRACT

A camera system that transfers static image data while reducing power consumption is provided. A static image application issues a frame transfer command at a certain transfer period to a camera module. In each transfer period, the camera module wakes up from a suspend state and generates static image data. After the end of the transfer, the camera module transitions to the suspend state. The camera module is able to transition to the suspend state at each transfer period and thus is able to reduce power consumption.

21 Claims, 6 Drawing Sheets

(56) References Cited

OTHER PUBLICATIONS

"Universal Serial Bus Specification", Apr. 27, 2000 (Part 1) pp. i-297.
"Universal Serial Bus Specification", Apr. 27, 2000 (Part 2) pp. 298-622.
"Universal Serial Bus Device Class Definition for Video Devices", Jun. 1, 2005.
"Universal Serial Bus Device Class Definition for Communication Devices", Jan. 19, 1999.

* cited by examiner

METHOD IN WHICH CAMERA MODULE TRANSFERS IMAGE DATA AND COMPUTER THEREFOR

CROSS-REFERENCE TO RELATED APPLICATIONS

This application is a national patent application and claims priority to Japanese Patent Application Number 2011-196887 entitled "METHOD IN WHICH CAMERA MODULE TRANSFERS IMAGE DATA AND COMPUTER THEREFOR" and filed on 9 Sep. 2011 for Susumu Shimotono, Jun Sugiyama, and Hideki Kashiyama, which is incorporated herein by reference.

FIELD

The present invention relates to a technique in which a camera module continuously transfers image data to a host device at a frame rate lower than that of dynamic image data, and more particularly to a technique for reducing power consumption of the camera module and a host device during data transfer.

BACKGROUND

A singly-existing digital camera can be roughly classified into a still camera which photographs a static image and a video camera that photographs a dynamic image. In both cases of the still camera and the video camera, the camera displays an image of a subject on a liquid-crystal display monitor when the camera is powered on and enters a photographing preparation state. A user takes a static image or a dynamic image while checking the image on the liquid-crystal display monitor and records data into a camera body.

In some cases, a video phone or a camera module intended to photograph an ambient environment may be mounted into a host device such as a notebook personal computer (hereinafter, referred to as "note PC"), a tablet computer, or a feature phone. Generally, image data photographed by a camera module is received by an application of a note PC and then recorded into a recording medium of the host device. Therefore, it can be said that the camera module built in the note PC is combined with the application that processes and records image data, thereby constructing a camera system compatible with a singly-existing digital camera.

In this kind of camera system, it is also possible to implement an application program (application) that requires only static images. The camera module transfers image data to the system at a dynamic-image frame rate of 30 fps after entering the photographing preparation state. The transfer of dynamic image data in this case aims at monitoring images to be photographed, and therefore generally the number of pixels is set lower than that of the originally intended dynamic image data. The term "frame rate" means the number of frames (fps) generated or transferred per unit time on the assumption that one frame is image data composed of pixel signals output from an aggregation of a plurality of image pickup devices for generating one static image. One static image corresponds to one frame.

The application determines the timing for selecting a static image out of the received dynamic image data for monitor display. Then, the camera module transfers static image data having the original number of pixels at the determined timing. Alternatively, in the middle of transferring the dynamic image data having the original number of pixels, the static image data can be directly acquired from there. More specifically, in order to acquire a static image by a camera system, it is necessary to acquire dynamic image data having the number of pixels for monitor display or the original number of pixels for a predetermined time period during which an application or a user selects a required static image.

Patent Document 1 provides emergency supervisory equipment that achieves a reduction in power consumed to process a dynamic image. The emergency supervisory equipment normally pauses the operation of a dynamic image processed part and starts the operation of the dynamic image processed part when triggered by voice anomaly detection. Patent Document 2 discloses an image display system that reduces the power consumption of the side that outputs static image data when storing the static image data in a dynamic image format and then outputting it to an image display device. A digital video camera performs a transfer operation of static image data based on an image transfer request command from a digital television and thereafter operates in a low power consumption mode until receiving an image transfer request command sent from the digital television.

Non-patent Document 1 prescribes Still Image Capture for acquiring a still image from a camera module connected by USB. This document describes that a host device once halts the video streaming and then acquires a still image and thereafter returns to a video streaming transfer mode or transfers a still image by using a dedicated bulk still image pipe without halting video streaming.

Non-patent Documents 2 and 3 describe selective suspend of a USB device referred to as "low power mode." In the selective suspend, a USB client driver sends a request packet to a USB bus driver when it is determined that the USB device is in an idle state. When all USB devices connected to the USB hub enter the idle state, thereupon the USB bus driver makes the USB bus connecting to the USB hub transition to the idle state. Then, the USB device that has detected the state transition of the bus transitions to a selective suspend state.

Patent Document 1—Japanese Patent Application Laid-Open No. 2004-120595

Patent Document 2—Japanese Patent Application Laid-Open No. 2008-187536

Non-patent Document 1—USB Device Class Definition for Video Devices, RE vision 1.1, Jun. 1, 2005

Non-patent Document 2—Universal Serial Bus Specification Revision 2.0

Non-patent Document 3—Power saving of using USB Selective Suspend Support Whitepaper, Intel Mobile Platforms Group Version 0.3, May 20, 2003, Kris Fleming

SUMMARY

The camera module is able to transition to a suspend state unless it transfers image data. In conventional camera systems, however, it is necessary to send dynamic image data for monitor display even if the host side needs only static image data. Therefore, even in the case where static image data is to be transferred at a regular interval, the camera module cannot transition to the suspend state until the data transfer of the dynamic image ends. Further, data traffic increases beyond necessity because dynamic image data is transferred in a photographing preparation stage. Moreover, the CPU load for processing streaming data increases, by which the power consumption of the host device also increases more than necessary.

A note PC contains various applications using dynamic image data such as those for a video phone and videography. When the note PC operates on battery-power, the power consumption of the camera system needs to be minimized. Therefore, when the camera system is operated, generally an AC/DC adapter is connected to the camera system to use AC power. Recently, however, there are applications being developed that want to acquire static image data continuously at a frame rate lower than the frame rate of dynamic image data.

For example, there could exist an application that determines the direction of the face of a user using a note PC in a meeting by acquiring a static image of the user's face every one or two seconds. When the face of the user points in a direction different from the direction toward the screen, or the user's eyes are turned away from the screen, the application would stop the backlight of a display or decrease the clock frequency of a processor to shift the note PC to a power-saving state. The note PC would then return to the normal state when the user's face points in the direction of the screen.

A conventional camera system cannot be used when this kind of application is put into practice on a note PC operating on battery power because of the high power consumption. Moreover, because it is difficult to use dynamic images when a note PC is operating on battery-power in a remote location, it may be required in some cases, to use static images sent at certain intervals in order to hold a teleconference.

Therefore, the object of the present invention is to provide a method of transferring image data from a camera module to a host device while reducing power consumption. Another object of the present invention is to provide a method of continuously transferring static image data at a frame rate lower than the frame rate of dynamic image data while reducing the power consumption of a camera system. Still another object of the present invention is to provide a method of transferring image data while satisfying both a maintained frame rate requested by the host device and a reduction in power consumption. Further, another object of the present invention is to provide a camera system, a camera module, a computer, and a computer program for implementing the methods.

The present invention provides a method of transferring image data from a camera module, which includes an image sensor, to a host device. The camera module resides in a low-power state, which requires less power consumption than in a photographing state, during a period of time other than a period of time necessary for transferring the image data. The host device issues ordered transfer requests of image data to the camera module. Upon receiving the transfer request, the camera module transitions from the low-power state to the photographing state. The camera module, which has transitioned to the photographing state, generates image data and transfers the image data to the host device. In response to the end of the transfer, the camera module transitions to the low-power state.

According to the present invention, the camera module does not need to transfer dynamic image data for monitor display and the host device transfers only required image data. Therefore, unless a transfer operation is performed, the camera module is able to transition to the low-power state. Thus, not only the power consumption of the camera module, but also the traffic of the image data is reduced to the required minimum, thereby also enabling a reduction in the power consumption of the bus and the CPU that process the traffic.

The transfer request may be issued at a certain transfer period. The host device is able to set the lower limit of an acceptable frame rate or the upper limit of a transfer period. In the static image transfer mode, the camera module needs to transition to the low-power state without fail in each transfer period. Therefore, when a practical transfer period is set between the minimum value of the transfer period calculated from an actual operating time in the photographing state in each transfer period and the maximum value of the transfer period calculated from the frame rate requested by the host device, the time during which the camera module resides in the low-power state can be secured while satisfying the request from the host device. Although the image data transferred in each transfer period may be composed of a plurality of frames, one frame of image data enables an increase in time during which the camera module resides in the low-power state, thereby reducing the power consumption to the maximum.

While the actual operating time depends on the inherent performance of the camera module, the actual operating time can be reduced by setting the parameter values, which have been previously acquired without calibration in each transfer period, into the camera module. A reduction in the actual operating time enables an increase in time during which the camera module resides in the low-power state in each transfer period or a decrease in the transfer period relative to the time during which the camera module resides in the low-power state (an increase in the frame rate). This achieves both a reduction in power consumption of the camera module and an increase in the frame rate.

The previously acquired parameter values can be those acquired by running the calibration so as to adapt the camera module to photographing conditions in a first transfer period. The method of fixing the parameter values in the second and subsequent transfer periods by skipping the calibration is based on the assumption that the photographing conditions at the beginning of photographing do not change.

In actuality, however, the host device cannot acquire image data having a desirable image quality in some cases because the photographing conditions change from those at the beginning of photographing. In order to cope with the changing conditions, the host device is able to request the camera module to rerun the calibration on the basis of the result of evaluating static image data. The host device or the camera module is able to set parameter values acquired by rerunning the calibration. The parameter may include rolling shutter exposure time and white balance.

The host device is able to change the interval between transfer requests by evaluating regularly received image data. For example, the interval is shortened in the case where a subject frequently changes and the interval is prolonged in the case where the subject infrequently changes. The change in the interval between transfer requests enables the transfer of unnecessary image data to be omitted or the image data to be transferred at required timing, by which the power consumption of the camera system can be effectively reduced while sufficiently satisfying the requirement of the host device.

The host device may be a computer. In this case, the camera module may be connected to the system via a USB interface. The present invention is able to transfer static image data at a frame rate of, for example, one to two fps while remarkably reducing the power consumption of the camera system. This enables implementation of an application that uses image data transferred at such a frame rate in a battery-powered portable computer.

According to the present invention, there can be provided a method of transferring image data from a camera module to a host device while reducing power consumption. Furthermore, according to the present invention, there can be provided a method of transferring static image data continuously at a frame rate lower than the frame rate of dynamic image data while reducing power consumption of a camera system. Still further, according to the present invention, there can be provided a method of transferring image data while satisfying both a maintained frame rate requested by the host device and a reduction in power consumption. Furthermore, according to the present invention, there can be provided a camera system, a camera module, a computer, and a computer program for implementing the above methods.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

[Hardware Configuration of Camera System]

Figure 1:
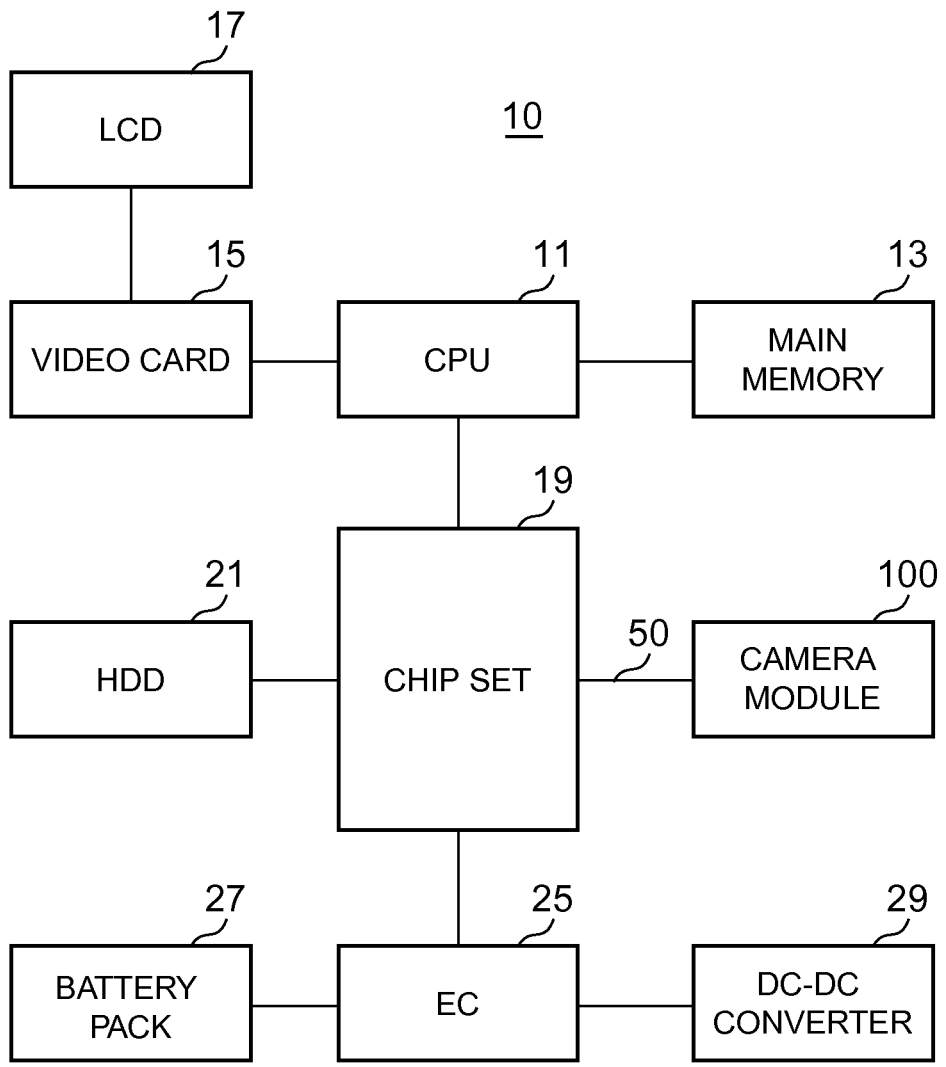
FIG. 1 is a functional block diagram illustrating the hardware configuration of a camera system implemented by a note PC.

FIG. 1 is a functional block diagram illustrating the hardware configuration of a camera system implemented by a note PC 10. The CPU 11 includes a memory controller and a PCI Express controller and is connected to a main memory 13, a video card 15, and a chip set 19. An LCD 17 is connected to the video card 15. The chip set 19 includes a real time clock (RTC) and SATA, USB, PCI Express, and LPC controllers. A HDD 21 is connected to the SATA controller. A USB controller is composed of a plurality of hubs constructing a USB host controller, a route hub, and an I/O port.

A camera module 100 is a USB device compatible with the USB 2.0 standard or the USB 3.0 standard. The camera module 100 is connected to the USB port of the USB controller via one or three pairs of USB buses 50, which transfer data using a differential signal. The USB port, to which the camera module 100 is connected, may share a hub with another USB device. Preferably the USB port is connected to a dedicated hub of the camera module 100 in order to effectively control the power of the camera module 100 by using a selective suspend mechanism of the USB system. The camera module 100 may be of an incorporation type in which it is incorporated into the housing of the note PC 10 or may be of an external type in which it is connected to a USB connector attached to the housing of the note PC 10.

Moreover, the camera module 100 may be connected to the note PC 10 via a wireless USB connection. The camera system according to the present invention is able to transfer image data in a new static image transfer mode in addition to a dynamic image transfer mode that has conventionally existed. The camera module 100 transfers image data in either of the dynamic image transfer mode and the static image transfer mode.

Here, the system of the note PC 10 constructing the camera system includes hardware such as the CPU 11, the chip set 19, and the main memory 13. The system of the note PC 10 also includes software such as a static image application 202, device drivers 207, 209, 211, and 231 of the respective layers, a static image transfer service 205, and an operating system 203 illustrated in FIG. 3. The static image transfer mode is used by the static image application 202 to acquire a static image. The contents of the static image transfer mode will be described later.

An EC 25 is a microcontroller that controls the temperature of the inside of the housing of the computer 10 or controls the operation of a keyboard or a mouse. The EC 25 operates independently of the CPU 11. The EC 25 is connected to a battery pack 27 and a DC-DC converter 29. The EC 25 is further connected to a keyboard, a mouse, a battery charger, an exhaust fan, and the like. The EC 25 is capable of communicating with the battery pack 27, the chip set 19, and the CPU 11. The battery pack 27 supplies the DC-DC converter 29 with power when an AC/DC adapter (not shown) is not connected to the battery pack 27. The DC-DC converter 29 supplies the device constructing the computer 10 with power.

[Camera Module]

Figure 2:
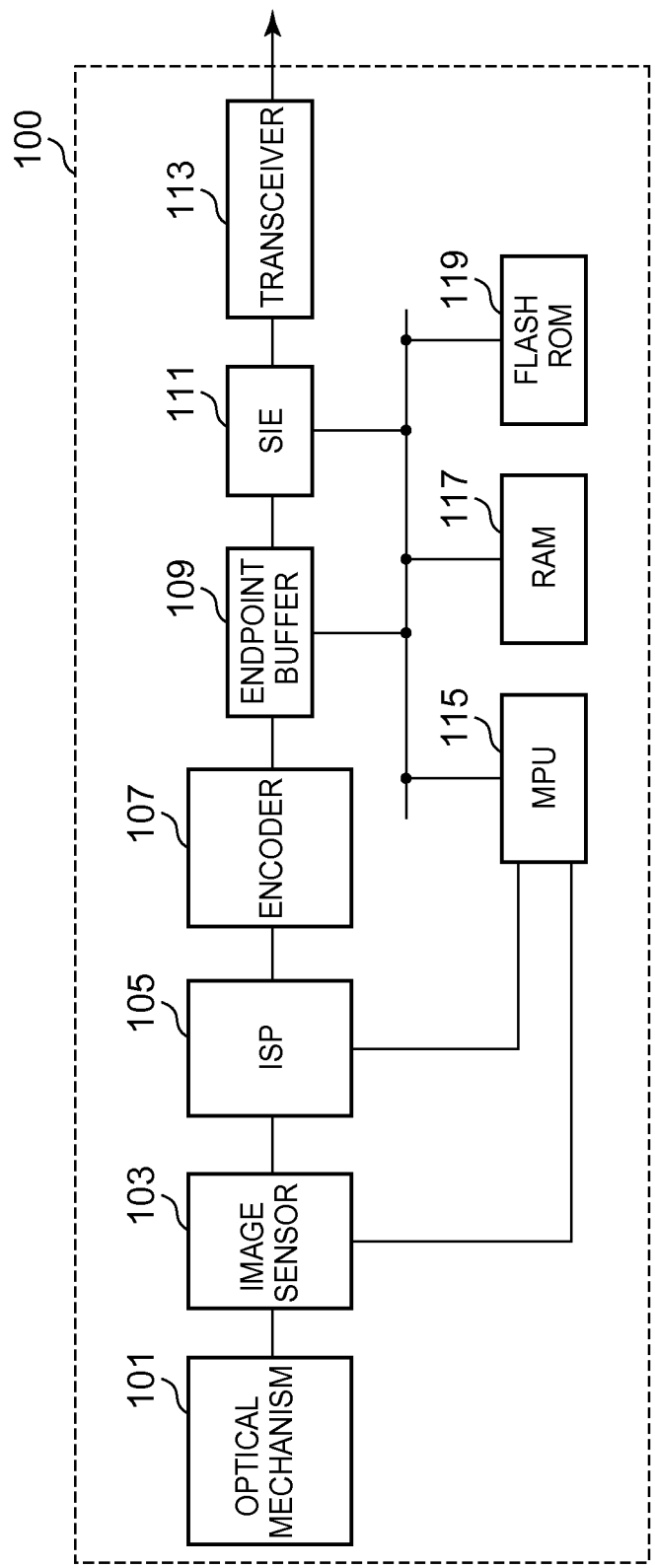
FIG. 2 is a functional block diagram illustrating a schematic configuration of a camera module.

FIG. 2 is a functional block diagram illustrating a schematic configuration of the camera module 100. The camera module 100 is able to transfer VGA (640×480), QVGA (320×240), WVGA (800×480), WQVGA (400×240), and other image data in the static image transfer mode. An optical mechanism 101 includes an optical lens and an optical filter and provides an image of a subject on an image sensor 103.

The image sensor 103 includes a CMOS image sensor that converts electric charges, which correspond to the amount of light accumulated in photo diodes forming pixels, to electric signals and outputs the electric signals. The image sensor 103 further includes a CDS circuit that suppresses noise, an AGC circuit that adjusts gain, an AD converter circuit that converts an analog signal to a digital signal, and the like. The image sensor 103 outputs digital signals corresponding to the image of the subject. The image sensor 103 is able to generate image data at a frame rate of 30 fps when operating in the dynamic image transfer mode.

The CMOS image sensor is provided with an electronic shutter referred to as a "rolling shutter." The rolling shutter controls exposure time so as to be optimal for a photographing environment with one or several lines as one block. In one frame period, or in the case of an interlace scan, the rolling shutter resets signal charges that have accumulated in the photo diodes, and which form the pixels during one field period, in the middle of photographing to control the time period during which light is accumulated corresponding to shutter speed. In the image sensor 103, a CCD image sensor may be used, instead of the CMOS image sensor.

An image signal processor (ISP) 105 is an image signal processing circuit which performs correction processing for correcting pixel defects and shading, white balance processing for correcting spectral characteristics of the image sensor 103 in tune with the human luminosity factor, interpolation processing for outputting general RGB data on the basis of signals in an RGB Bayer array, color correction processing for bringing the spectral characteristics of a color filter of the image sensor 103 close to ideal characteristics, and the like. The ISP 105 further performs contour correction processing for increasing the resolution feeling of a subject, gamma processing for correcting nonlinear input-output characteristics of the LCD 17, and the like.

An encoder 107 compresses image data received from the ISP 105. An endpoint buffer 109 forms a plurality of pipes for transferring USB data by temporarily storing data to be transferred bidirectionally to or from the system. A serial interface engine (SIE) 111 packetizes the image data received from the endpoint buffer 109 so as to be compatible with the USB standard and sends the packet to a transceiver 113 or analyzes the packet received from the transceiver 113 and sends a payload to an MPU 115. When the USB bus 50 is in the idle state for a predetermined period of time or longer, the SIE 111 interrupts the MPU 115 in order to transition to a suspend state. The SIE 111 activates the suspended MPU 115 when the USB bus 50 has resumed.

The transceiver 113 includes a transmitting transceiver and a receiving transceiver for USB communication. The MPU 115 runs enumeration for USB transfer and controls the operation of the camera module 100 in order to perform photographing and to transfer image data. The camera module 100 conforms to power management prescribed in the USB standard. When being interrupted by the SIE 111, the MPU 115 halts the internal clock and then makes the camera module 100 transition to the suspend state as well as itself.

When the USB bus 50 has resumed, the MPU 115 returns the camera module 100 to the power-on state or the photographing state. The MPU 115 interprets the command received from the system and controls the operations of the respective units so as to transfer the image data in the dynamic image transfer mode or the static image transfer mode. When starting the transfer of the image data in the static image transfer mode, the MPU 115 first performs the calibration of rolling shutter exposure time (exposure amount), white balance, and the gain of the AGC circuit and then acquires optimal parameter values for the photographing environment at the time, before setting the parameter values to predetermined registers for the image sensor 103 and the ISP 105.

The MPU 115 performs the calibration of exposure time by calculating the average value of luminance signals in a photometric selection area on the basis of output signals of the CMOS image sensor and adjusting the parameter values so that the calculated luminance signal coincides with a target level. The MPU 115 also adjusts the gain of the AGC circuit when calibrating the exposure time. The MPU 115 performs the calibration of white balance by adjusting the balance of an RGB signal relative to a white subject that changes according to the color temperature of the subject.

When the image data is transferred in the dynamic image transfer mode, the camera module does not transition to the suspend state during a transfer period. Therefore, the parameter values once set to registers do not disappear. In addition, when transferring the image data in the dynamic image transfer mode, the MPU 115 appropriately performs calibration even during photographing to update the parameter values of the image data.

In contrast, when image data is transferred in the static image transfer mode, the camera module transitions to the suspend state for each transfer period. Therefore, depending on the connected image sensor, a part or all of the parameter values set to internal registers of the image sensor may disappear because it is not assumed that the camera module gradually transitions to the suspend state while intermittently repeating photographing in use of the camera module. Therefore, there is no design incentive for holding the values of the internal registers in the suspend state. In the static image transfer mode, calibration is performed only in photographing during the first transfer period. In photographing during the subsequent transfer periods, the parameter values acquired by the first calibration can be set for each wakeup.

Skipping the calibration in each of the second and subsequent transfer periods enables the time during which the camera module 100 resides in the suspend state to be secured at a predetermined value, or greater, in order for power consumption to be sufficiently reduced, even in the case of further increasing the time during which the camera module 100 resides in the suspend state in the middle of transferring image data or decreasing the transfer period. When regularly transferring the image data in the static image transfer mode, the MPU 115 controls the operations of the image sensor 103 and the ISP 105 so as to perform the calibration only in the first transfer. In this control, the MPU 115 is able to send the parameter values acquired by calibration to the system at the time of the first transfer of the static image data and to set the parameter values received from the system in the second and subsequent transfer periods.

When receiving an instruction of calibration from the system in the static image transfer mode, the MPU 115 performs calibration and sets new parameter values before an immediate data transfer and sends the parameter values to the system. In addition, without sending the parameter values to the system, the MPU 115 may set the parameter values by reading from a flash ROM 119 previously stored parameter values, in each transfer period. The flash ROM 119 also stores programs run by the MPU 115 and parameter values not requiring calibration. The MPU 115 is able to interpret the command received from the system to perform calibration or change the number of frames to be transferred in each transfer period.

The camera module 100 is a bus-powered device that operates with power supplied from the USB bus. Note that, however, the camera module 100 may be a self-powered device that operates with its own power. In the case of the self-powered device, the MPU 115 controls the self-supplied power to follow the state of the USB bus 50.

The camera module 100 transitions between a selective suspend state and a power-on state on the basis of the USB standard. The camera module 100 may transition to a plurality of low-power states when it is in the selective suspend state. When operating in the static image transfer mode, preferably the camera module 100 transitions to the low-power state in which the power consumption is the lowest when there is no need to transition to the power-on state in order to send the image data. The power consumption in the selective suspend state in which the power consumption is the lowest is preferably 10% or lower of the power consumption in the power-on state or the photographing state.

FIGS. 1 and 2 simplistically illustrate the main hardware configuration and the relation of connection related to the present embodiment to describe the present embodiment. In addition to the devices mentioned in the above description, a lot of devices are used to constitute the camera system. These devices, however, are well-known to those skilled in the art and therefore are not mentioned in detail here. A plurality of blocks illustrated in the diagrams may be implemented into one integrated circuit or device or, by contrast, one block may be divided into a plurality of integrated circuits or devices, which are encompassed in the scope of the present invention, as long as those skilled in the art can make a selection arbitrarily.

[Software Configuration of Camera System]

Figure 3:
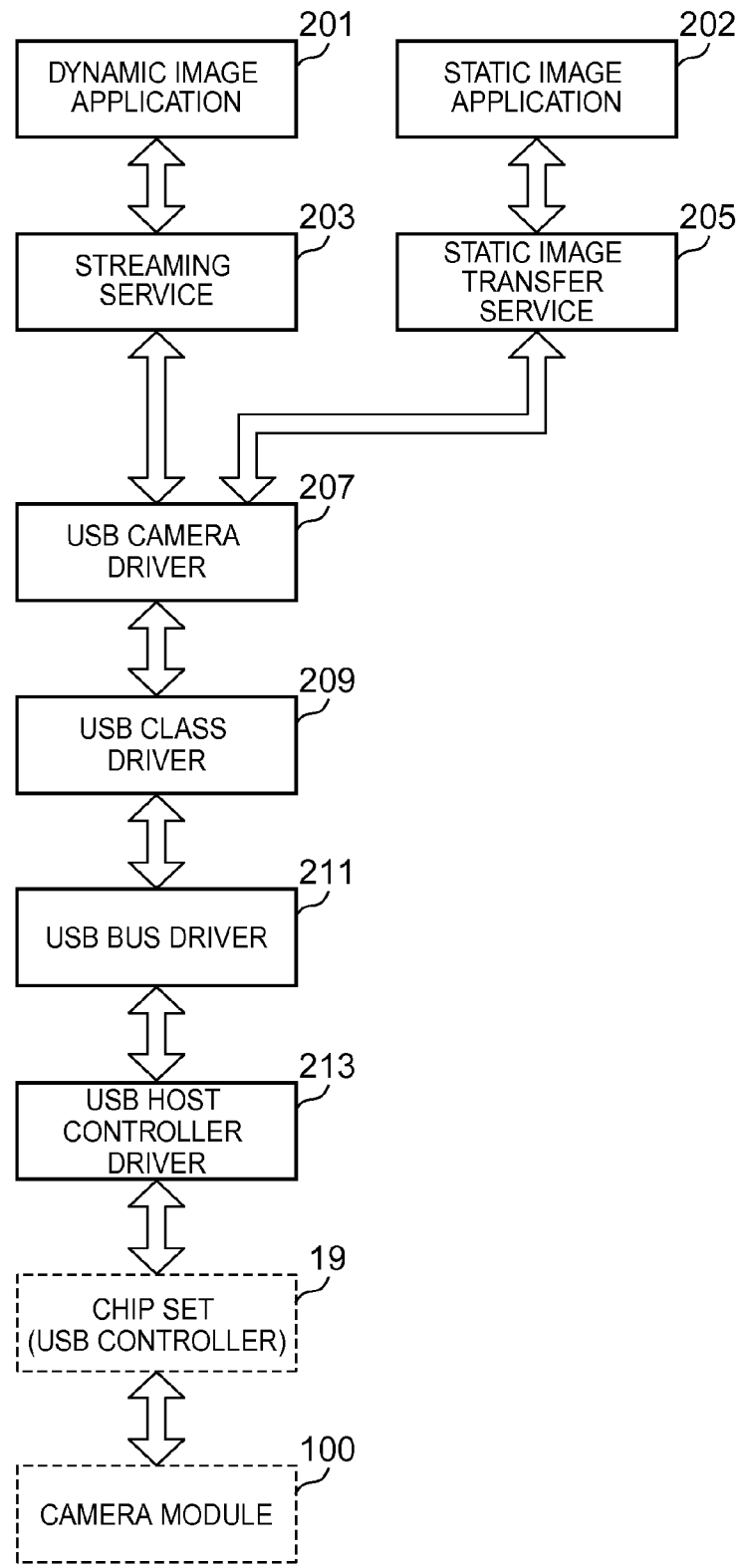
FIG. 3 is a functional block diagram illustrating the configuration of software loaded into the note PC constructing the camera system.

FIG. 3 is a functional block diagram illustrating the configuration of software loaded into the note PC 10. A dynamic image application 201 is a well-known program for acquiring dynamic image data from the camera module 100 to display the dynamic image data on the LCD 17 or to record it to the HDD 15. The dynamic image application 201 may be a video phone program or a dynamic image photographing program. The dynamic image application 201 is able to acquire a snapshot of a static image from the dynamic image data.

The static image application 202 is a new program for acquiring image data from the camera module 100 in the static image transfer mode to analyze or record the image data. The static image application 202 may be provided with a user interface for receiving a user's instruction. Although the static image application 202 may be run while the note PC 10 is supplied with power from the AC/DC adapter, the camera system operates with low power consumption and therefore the static image application 202 is able to run while it is supplied with power from the battery pack 27. The static image application 202 may be a program for controlling the power of the note PC 10 by determining the direction of the user's face, a program for monitoring the state of machinery, a program for a video phone, or a program for photographing the change state of the environment over a long time.

A streaming service 203, which is a service program provided by an OS, sends the dynamic image data in the dynamic image transfer mode to the dynamic image application 201, sends dynamic image data for monitor display for use in acquiring static image data to the dynamic image application 201, and passes a command issued by the dynamic image application 201 to a USB camera driver 207. A static image transfer service 205, which is a new program operating in the user mode of an OS, sends static image data transferred in the static image transfer mode to the static image application 202 and sends a command from the static image application 202 to the USB camera driver 207.

The USB camera driver 207 is a device driver that controls the operation of the camera module 100 and controls data transfers. The USB class driver 209 is a device driver that performs common processing defined in a USB video class. A USB bus driver 211 controls the operation of the USB bus connected to the USB controller.

The USB bus driver 211 causes the USB bus 50 connected to the camera module 100 to be in an idle state when receiving an instruction for making the camera module 100 transition to the selective suspend state from the USB camera driver 207. Further, the USB bus driver 211 causes the USB bus to transition to an active state (resume state) when receiving an instruction for resuming or an instruction for data transfer. A USB host controller driver 213 controls data transfer to a USB device and the operation of the USB host controller.

[Procedure in Static Image Transfer Mode]

Figure 4A:
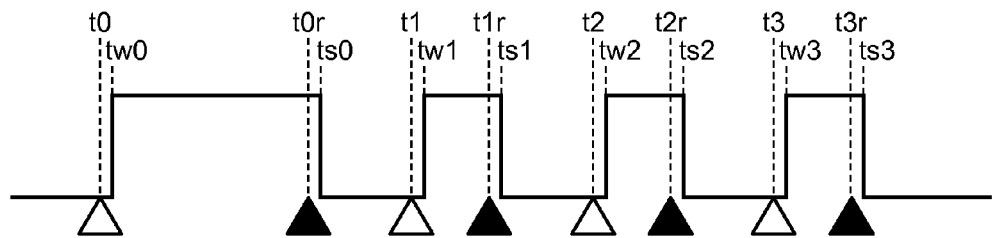
FIG. 4A is a diagram describing the operating state of the camera module in a static image transfer mode.
Figure 4B:
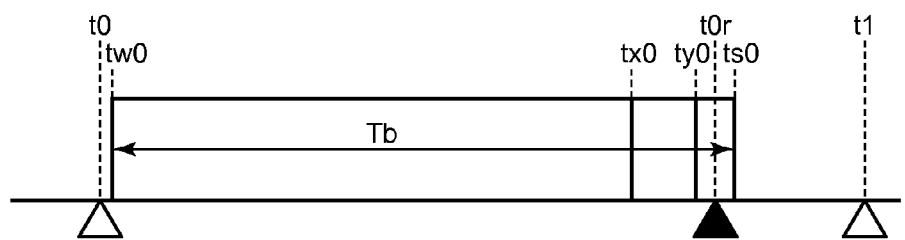
FIG. 4B is another diagram describing the operating state of the camera module in a static image transfer mode.
Figure 4C:
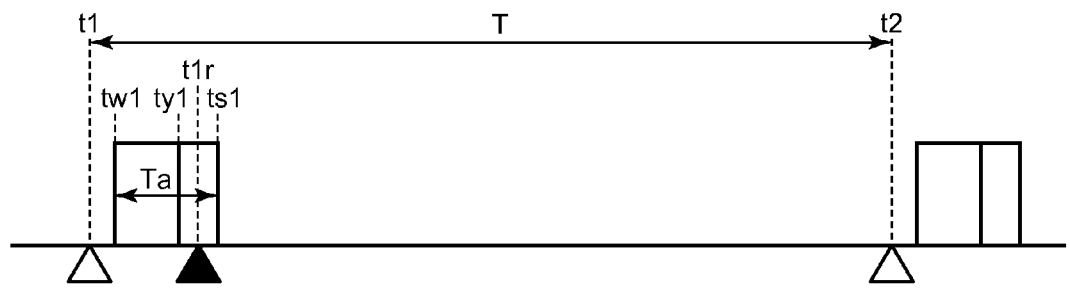
FIG. 4C is another diagram describing the operating state of the camera module in a static image transfer mode.
Figure 5:
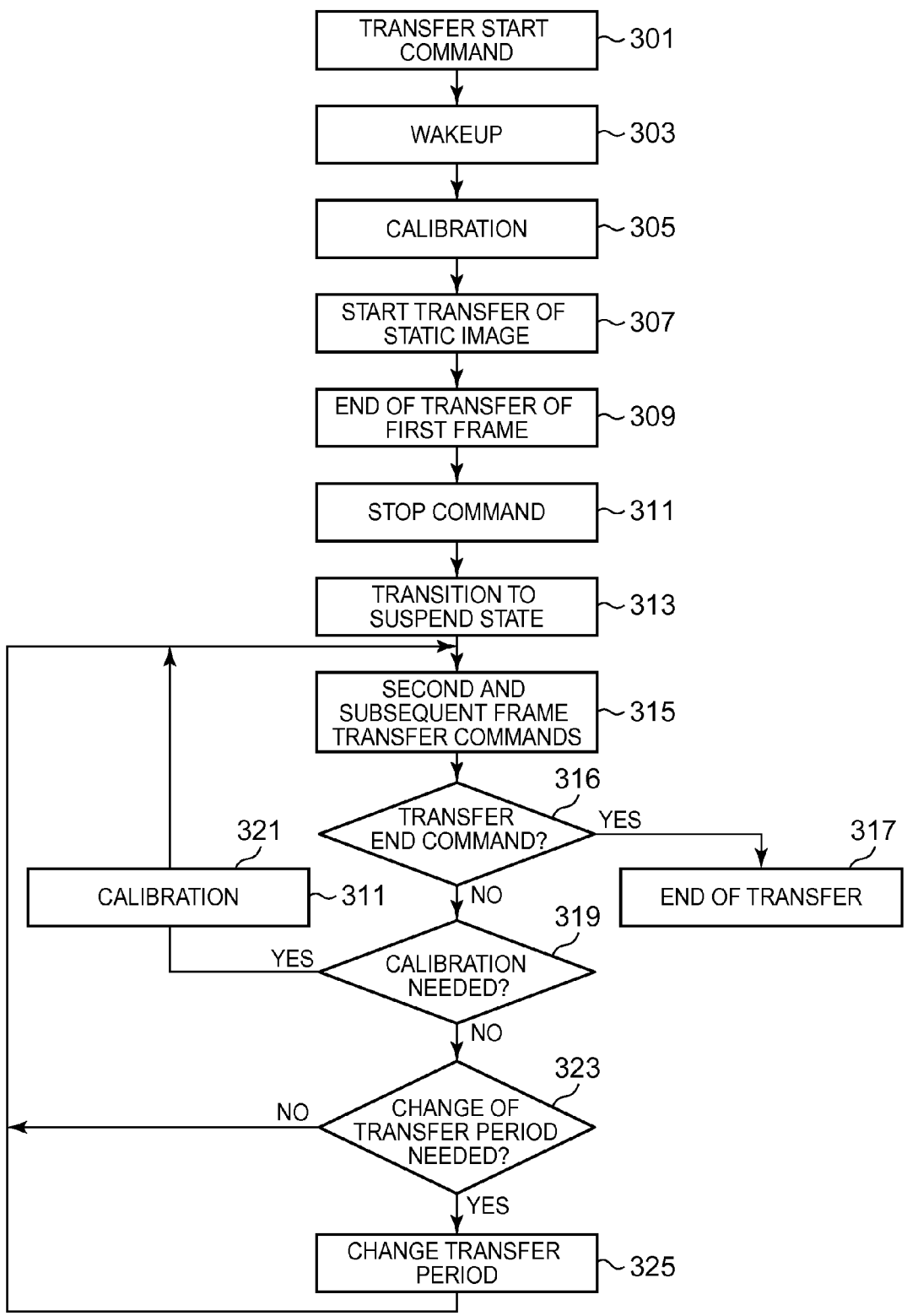
FIG. 5 is a flowchart describing a procedure for transferring image data in the static image transfer mode.

The following describes a procedure in which the camera module 100 transfers image data in the static image transfer mode with reference to FIGS. 4 and 5. FIG. 4 is a diagram describing the operating state of the camera module 100 in the static image transfer mode. FIG. 4A illustrates the entire operation, FIG. 4B illustrates the details of the first transfer period, and FIG. 4C illustrates the details of the second and subsequent transfer periods. FIG. 5 is a flowchart describing a procedure for transferring image data in the static image transfer mode.

In FIG. 4A, a certain time interval for issuing a frame transfer command in order to transfer second and subsequent image data is referred to as a transfer period T. For example, the time between time t1 for issuing a frame transfer command used to transfer the second and subsequent image data and time t2 for issuing a frame transfer command used to transfer third image data and time between the time t2 and time t3 for issuing a frame transfer command used to transfer fourth image data.

In block 301, the USB bus 50 transitions to the idle state and the camera module 100 transitions to a selective suspend state. In the static image transfer mode, the streaming service 203 is not performed and therefore the load on the CPU 11 is small. Various registers of the camera module 100 that sets parameter values are cleared. At time t0, the static image application 202 sends a transfer start command to the USB camera driver 207. The transfer start command includes the transfer period T and the number of transfer frames of image data.

It is assumed here that the transfer period is one second and the number of transfer frames is one frame, as an example. In this case, the frame rate is one fps. The frame rate is 0.5 fps if the transfer period is two seconds and is 2 fps if the number of transfer frames is two. The USB camera driver 207 sends one frame transfer command generated based on a transfer start command to the USB bus driver 211 via the USB class driver 209.

In block 303, the USB bus driver 211 resumes the USB bus 50 and sends the first frame transfer command to the camera module 100. Upon detecting that the USB bus 50 has resumed, the SIE 111 sends a clock pulse to the MPU 115 to activate the MPU 115. The MPU 115 starts the operation at time two and runs the frame transfer command to wake up the camera module 100.

In block 305, the MPU 115 sets fixed parameter values, which do not need calibration, stored in the flash ROM 119 to various registers. The MPU 115 further sets parameter values acquired by causing the image sensor 103 and the ISP 105 to perform calibration in order to acquire parameter values of exposure time, white balance, the gain of the AGC circuit, and the like.

Moreover, the MPU 115 sends the parameter values acquired by calibration in response to a request from the USB camera driver 207. The USB camera driver 207 stores the received parameter values into the main memory 13. Further, the MPU 115 resets the rolling shutters for all pixels in order and reaches time tx0. About one to two seconds are required from the time two when the camera module 100 wakes up to the time tx0 when the photographing preparation is completed.

In block 307, the camera module 100 starts to transfer the image data of the first frame by scanning the pixels in order at the time tx0 to read out image signals upon the end of the reset of the rolling shutters. The SIE 111 packetizes the pixel data output from the encoder 107 for each predetermined block and outputs the packets to the static image application 202. The MPU 115 controls the image sensor 103 to generate only the image data of one frame. In block 309, the MPU 115 completes the output of the image data of one frame at time ty0. At this time point, the camera module 100 may maintain the power-on state as a power state or may transition to the low-power state in which power consumption is slightly lower than the power-on state. The camera module 100, however, does not transition to the selective suspend state in which the power consumption is the lowest.

Since the frame rate of the image sensor 103 is 30 fps, time from the time tx0 to the time ty0 is approximately $\frac{1}{30}^{th}$ of a second (33 milliseconds). In block 311, upon detecting that the transfer of the first image data has been completed, the USB camera driver 207 sends a bus stop command for transitioning the camera module 100 to the suspend state to the USB bus driver 211 at time t0r. After receiving the bus stop command, the USB bus driver 211 transitions the USB bus 50 to the idle state.

Upon detecting that the USB bus 50 has transitioned to the idle state at time ts0, the SIE 111 interrupts the MPU 115 at block 313 to cause the camera module 100 to transition to the selective suspend state in which the power consumption is the lowest. The transition to the selective suspend state erases the parameter values set to the registers, and therefore parameter values need to be set again at the next readout.

The period of time from the time t0 to the time t1 includes the calibration time and thus is longer than the transfer period. In block 315, the USB camera driver 207, which has confirmed the completion of transferring the first image data at the time t1, sends the second frame transfer command to the camera module 100. When sending the second frame transfer command, the USB camera driver 207 sends the parameter values acquired from the camera module 100 in block 305 together. In order to send the second frame transfer command, the USB bus driver 211 resumes the USB bus 50.

Upon detecting that the USB bus 50 has resumed, the camera module 100 wakes up at time tw1. Unlike the case of transferring the image data of the first frame, the MPU 115 does not perform calibration before transferring the image data of the second and subsequent frames. The MPU 115 sets the fixed parameter values stored in the flash ROM 119 and the parameter values requiring calibration, which were acquired from the USB camera driver 207, to the respective registers.

Subsequently, the MPU 115 resets the rolling shutters, generates image data of one frame, and completes the output at time ty1. The photographing preparation time after the second frame transfer command is issued at the time t1, but before the MPU 115 is ready to generate image data, may be about 36 milliseconds or shorter total, including the reset time for rolling shutters, assuming the parameter setting time is about three milliseconds. Therefore, the period of time from the time t1 to the time ty1 can be within a range of about 70 milliseconds or lower, with the generation time (33 milliseconds) of image data for one frame added. In addition, the image data is transferred in units of a predetermined packet without awaiting that one frame of image data is generated after image data of several lines is generated, and therefore the output time may be ignored.

Upon detecting the completion of transferring the image data of one frame at the time ty1, the USB camera driver 207 sends a bus stop command to the USB bus driver 211 in order to cause the camera module 100 to transition to the selective suspend state in which the power consumption is the lowest at time t1r. After the USB bus 50 transitions to the idle state, the camera module 100 transitions to the selective suspend state at time ts1. The period of time from the time ty1 to the time ts1 is sufficiently short relative to the period of time from the time t1 to the time ty1.

During the period of time from the time tw1 to the time ts1 the camera module resides in the photographing state in each of the second and subsequent transfer periods. This is referred to as an actual operating time Ta. Similarly, the period of time from the time two, for transitioning to the photographing state in the first transfer period, to the time ts0, for transitioning to the selective suspend state, is referred to as an actual operating time Tb. As the rate of the actual operating time Ta, Tb to the transfer period T is smaller, the power consumption of the camera module 100 is lower relative to unit image data.

After starting the transfer of image data, the static image application 202 is able to end the transfer of static image data by issuing a transfer end command to the camera module 100 at any time. In block 316, if the camera module 100 has already received the transfer end command, the processing proceeds to block 317 to end the static image transfer mode and to transition to the selective suspend state. Unless the camera module 100 has received the transfer end command, the processing proceeds to block 319.

In this embodiment, when the image data is transferred, the calibration of the camera module 100 is performed only in the first transfer period and parameter values acquired by the calibration beforehand are used in the second and subsequent transfer periods on the assumption that the photographing conditions do not change. If the transfer of image data in the static image transfer mode is continued for a long time, however, a photographing condition of illuminance changes, by which a clear image might not be able to be obtained.

The static image application 202 issues a rerun command for rerunning calibration when it determines that the direction of the face cannot be recognized from the received image data or recognized image degradation by a well-known method. In block 319, if the static image application 202 issued the rerun command, the processing proceeds to block 321. In block 321, the camera module 100 runs calibration in the same procedure as block 305 and sends acquired parameter values to the USB camera driver 207.

When issuing a frame transfer command after receiving the parameter values, the USB camera driver 207 sends the updated parameter values to the camera module 100. The camera module 100 sets the updated parameter values received from the USB camera driver 207 to registers to generate new image data in the subsequent transfer periods. Returning to block 315, the USB camera driver 207 issues a frame transfer command at a certain period on the basis of the transfer start command acquired from the static image application 202, and the camera module 100 sends the static image data to the static image application 202 in the same procedure in each of the third and subsequent transfer periods.

Unless the static image application 202 issues the rerun command, the processing proceeds to block 323. The static image application 202 is able to change the transfer period where it is found that the acquired image data remarkably changes or the change is flat as a result of an analysis of the image data. In block 323, the static image application 202 determines whether a change of the transfer period is necessary. If it is found to be necessary, the processing proceeds to block 325; otherwise, the processing returns to block 315.

In block 325, the static image application 202 sends a change command for changing the transfer period to the USB camera driver 207. The USB camera driver 207 sends the subsequent frame transfer commands to the camera module 100 at the changed transfer period. The static image application 202 changes the transfer period, namely a frame rate on the basis of its necessity, thereby enabling image data of an amount, which is required per unit time, to be acquired in a method that requires the least power consumption.

In the case of acquiring a static image from the camera module 100 in a conventional method, the dynamic image application 201 has acquired the static image from the dynamic image data, which the streaming service 203 continues to send to the dynamic image application 201 until the acquisition of the static image is completed. Therefore, a large amount of image data is uselessly discarded, thereby increasing the power consumption of the CPU 11 that runs the streaming service 203. In the static image transfer mode, the camera system 10 only needs to transfer image data of one frame by performing the minimum operation. Therefore, the power consumption of the CPU 11 and that of the USB bus 50 can be largely reduced in addition to the power consumption of the camera module 100.

In this embodiment, the transfer of image data equivalent to one frame takes about 33 milliseconds. When the transfer period is one second, the time during which the camera module resides in the suspend state can be secured even if a plurality of frames are transferred in each transfer period. Therefore, an effect of reducing power consumption can be expected until a certain number of frames. Therefore, the number of frames for image data to be transferred in each transfer period may be two or more.

[Features of Static Image Transfer Mode]

In one aspect, the static image transfer mode is similar to the dynamic image transfer mode in that image data is transferred in order or at a certain period. A dynamic image is a set of static images updated per unit time, and therefore both can be distinguished by the frame rate of transferred image data.

The higher the frame rate of a dynamic image, the smoother the motion thereof. The amount of data, however, increases correspondingly. As to a frame rate, there are used 30 fps for a NTSC system, 25 fps for a PAL system and a SECAM system, and 15 fps for a one-segment receiving service (One Seg) for a cell phone or a mobile terminal. Accordingly, the static image transfer mode can be considered to be a method of transferring image data at a frame rate lower than the frame rates prescribed in the above systems and service.

The main feature of the present invention is to transition to the selective suspend state in each transfer period before transferring image data, achieving data transfer requiring less power consumption for a use that requires a certain frame rate, but does not require a frame rate as high as that of a dynamic image. The transfer period in the static image transfer mode is defined by the minimum limit from an expected value of the effect of reducing power consumption and the maximum limit from the frame rate requested by the application. In addition, the significance of skipping the calibration in each transfer period is to satisfy the requirements from both viewpoints to a maximum extent.

Here, it is assumed that Tb is an actual operating time from time two to time ts0 when the calibration illustrated in FIG. 4B is performed and Ta is an actual operating time from time tw1 to time ts1 when the calibration illustrated in FIG. 4C is skipped. On this assumption, Tb/T and Ta/T represent power-saving effects per unit static image, each of which will be referred to as a power reduction rate $\eta$.

Figure 6:
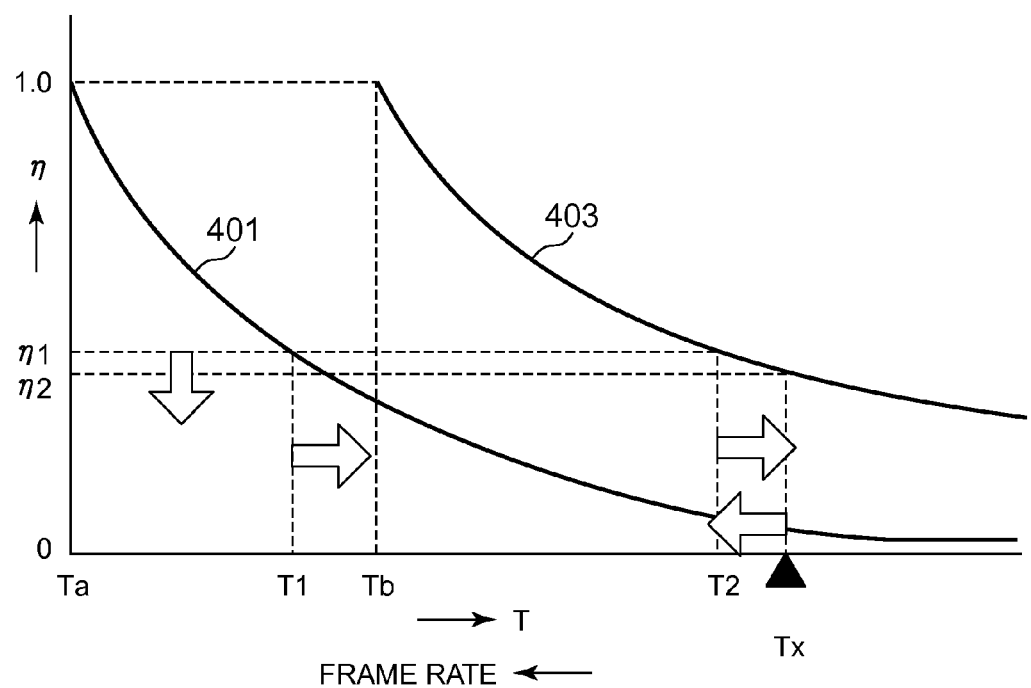
FIG. 6 is a diagram describing the feature of the static image transfer mode.

The power reduction rate represents a ratio of power consumption in the static image transfer mode to the power consumption of the camera module 100 that does not transition to the suspend state as in the conventional technique. FIG. 6 is a diagram illustrating a relationship between the transfer period T and the power reduction rate $\eta$. A line 401 represents a power reduction rate when calibration is skipped in each transfer period and a line 403 represents a power reduction rate when calibration is performed in each transfer period.

The inverse of the transfer period T on the horizontal axis corresponds to a frame rate. In both cases, an increase in the transfer period decreases the power reduction rate in inverse proportion to the increase. Here, the decrease in the power reduction rate means an improvement in the effect of reducing the power. When the transfer periods in the lines 401 and 403 are the actual operating times Ta and Tb, respectively, the power reduction rate is 1.0 and the camera module 100 does not transition to the suspend state. The actual operating times Ta and Tb are each composed of the wait time between a return from the selective suspend state and the generation of image data and the time for actually generating and outputting the image data, and the actual operating times Ta and Tb depend on the inherent performance of the camera module.

It is assumed here that the actual operating times Ta and Tb are given values. Then, to transition to the suspend state in each transfer period, there needs to be a theoretical lower limit for the transfer period or a theoretical upper limit for the frame rate. For example, if the actual operating time Ta in the case of no calibration is approx. 70 milliseconds, 100 milliseconds obtained by adding 30 milliseconds as the suspend transition time to 70 milliseconds can be considered to be a theoretical lower limit of the transfer period. This value corresponds to 10 fps with frame rate conversion. In the case of carrying out the calibration, the actual operating time Tb is long such as about one to two seconds and therefore two seconds can be considered to be a theoretical lower limit of the transfer period. This value corresponds to 0.5 fps with frame rate conversion.

In the static image transfer mode, the power reduction rate is expected to be high to some extent in comparison with a case where the camera module 100 continuously maintains the power-on state. Moreover, further image data needs to be updated at some frequency, which is not so frequent as for a dynamic image, in order to accomplish a purpose of the application. At this point, a request of an upper limit on the power reduction rate $\eta$ arises for the static image transfer mode, and thus the static image application 202 makes a request of the upper limit on a transfer period or the lower limit of a frame rate.

It is assumed that is the upper limit of the power reduction rate in FIG. 6. If calibration is not performed, the transfer period needs to be set to T1 or longer in order to cause the power reduction rate to be $\eta 1$ or lower. If the calibration is performed, the transfer period needs to be set to T2 or longer in order to cause the power reduction rate to be η1 or lower. Assuming that Tx is the upper limit of the transfer period T based on the request from the application, the transfer period can be set to a value between T1 and Tx if the calibration is not performed and can be set to a value between T2 and Tx if the calibration is performed.

As apparent from FIG. 6, if the frame rate requested from the static image application 202 increases and thereby the transfer period Tx is smaller than T2, calibration, if performed, disables the static image transfer mode to be achieved. In addition, if the upper limit of the power reduction rate η is lowered to less than η2, the transfer period T becomes longer than T2. Then, if the calibration is performed in this condition, the static image transfer mode cannot be achieved. Moreover, for a transfer period by which the static image transfer mode can be achieved even if the calibration is performed, a lower power reduction rate is achieved when the calibration is not performed.

As an example, the lower limit of the transfer period with the upper limit of the power reduction rate assumed to be 0.1 is about one second (the upper limit of the frame rate is one fps) if the calibration is not performed and it is 20 seconds (the upper limit of the frame rate is 0.05 fps) if the calibration is performed. Moreover, the lower limit of the transfer period with the upper limit of the power reduction rate lessened to 0.2 is 0.5 second (the upper limit of the frame rate is two fps) if the calibration is not performed and it is 10 seconds (the upper limit of the frame rate is 0.1 fps) if the calibration is performed. Therefore, the practical transfer period in the static image transfer mode is able to be determined based on the upper limit of the power reduction rate and the lower limit of the frame rate requested from the application.

Although the description has been made with an example of the USB interface as an interface for use in connecting the camera module to the system, the interface may be a local interface such as IEEE 1394. In addition, the camera module may be connected to the note PC 10 via a wired or wireless network. Moreover, description has been made, as an example, on the control of the wakeup of the camera module 100 and the transition to the selective suspend state in each transfer period by using the frame transfer command and the stop command of the USB camera driver 207. In the present invention, however, it is possible to perform the control of the power state after receiving the transfer start command but before receiving the transfer end command in the firmware of the camera module 100.

For example, when image data is transferred with a transfer period specified by the static image application 202, the camera module 100 is able to determine the timing of transition to the suspend state and the timing of transition to the photographing state by itself. In this condition, during the suspend state, the timing of wakeup may be acquired by supplying power only to the minimum circuits for measuring the time or by using the discharge time of electric charges accumulated in a capacitor.

The above has described an example in which the parameter values, which the camera module 100 acquired by calibration, are sent once to the USB camera driver 207. The USB camera driver 207 sends the parameter values to the camera every time it sends a frame transfer command. The parameter values, however, may be stored in the flash ROM 119 and, in the static image transfer mode, the MPU 115 may set the parameter values to respective registers at every wakeup.

While the present invention has been described by using a particular embodiment illustrated in the accompanying drawings, the present invention is not limited to the embodiment illustrated in the drawings, and naturally any conventionally known configuration may be used as long as the effect of the present invention is achieved.

DESCRIPTION OF SYMBOLS

10 Camera system
100 Camera module

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of transferring image data from a camera module including an image sensor to a host device, comprising the steps of:
   the host device issuing a plurality of ordered transfer requests of image data to the camera module, wherein each transfer request of the plurality of transfer requests is issued at a predetermined transfer period of a plurality of transfer periods corresponding to the plurality of transfer requests, a transfer period comprising an interval of time between a transfer request and a subsequent transfer request;
   the camera module transitioning from a low-power state to a photographing state in each transfer period;
   the camera module generating image data based on a predetermined frame rate, the frame rate determining an amount of image data to be generated in each transfer period, wherein the inverse of the frame rate corresponds to the transfer period;
   the camera module transferring the image data to the host device in each transfer period; and
   the camera module transitioning to the low-power state in each transfer period in response to the end of the transfer.

2. The method of claim 1, wherein the image data transfer request step includes issuing a transfer request at a certain transfer period.

3. The method of claim 2, wherein the transfer period is set to a value between an actual operating time in the photographing state in each transfer period and the time calculated from a frame rate needed for the host device.

4. The method of claim 1, wherein the image data transferred in each transfer period is one frame of image data.

5. The method of claim 1, wherein calibration for adaptation to photographing conditions is skipped and previously-acquired parameter values are set in the camera module in each transfer period.

6. The method of claim 5, wherein the previously-acquired parameter values are those acquired by the camera module by running the calibration in a first transfer period.

7. The method of claim 5, further comprising the steps of:
   the host device evaluating the image data;
   the host device issuing a request to rerun the calibration to the camera module on the basis of a result of the evaluation; and
   the camera module setting the parameter values acquired by the rerun.

8. The method of claim 1 further comprising the steps of:
   the host device evaluating the image data; and
   the host device changing an interval between the transfer requests of the image data on the basis of a result of the evaluation.

9. A computer program product comprising a non-transitory computer readable storage medium storing computer usable program code executable to cause a computer capable of receiving image data from a camera module including an image sensor to implement the functions of:
- causing the camera module to transition from a photographing state to a low-power state;
- issuing a plurality of ordered frame transfer commands to the camera module, wherein each frame transfer command of the plurality of frame transfer commands is issued at a predetermined transfer period of a plurality of transfer periods corresponding to the plurality of frame transfer commands, a transfer period comprising an interval of time between a frame transfer command and a subsequent frame transfer command;
- causing the camera module to transition from the low-power state to the photographing state in each transfer period;
- receiving image data generated by the camera module in response to the frame transfer command, the camera module generating image data based on a predetermined frame rate, the frame rate determining an amount of image data to be generated in each transfer period, wherein the inverse of the frame rate corresponds to the transfer period; and
- causing the camera module to transition to the low-power state in each transfer period in response to the reception of the image data.

10. A camera system comprising:
- a camera module that includes an image sensor and is capable of outputting dynamic image data; and
- a host device that is connected to the camera module and issues a plurality of ordered transfer requests of image data to the camera module, wherein each transfer request of the plurality of transfer requests is issued at a predetermined transfer period of a plurality of transfer periods corresponding to the plurality of transfer requests, a transfer period comprising an interval of time between a transfer request and a subsequent transfer request;
- wherein the camera module transfers the image data to the host device with repeating power transition between a photographing state and a low-power state during each transfer period, the image data being generated based on a predetermined frame rate, the frame rate determining an amount of image data to be generated in each transfer period, wherein the inverse of the frame rate corresponds to the transfer period.

11. The camera system of claim 10, wherein the camera module sets parameter values acquired by performing calibration for adaptation to a first photographing condition at the time of transition to the photographing state in each transfer period.

12. The camera system of claim 10, wherein the host device requests the camera module to update the parameter values.

13. A computer comprising:
- an interface that receives image data from a camera module including an image sensor;
- a transfer requesting unit that issues a plurality of ordered transfer requests of image data to the camera module, wherein each transfer request of the plurality of transfer requests is issued at a predetermined transfer period of a plurality of transfer periods corresponding to the plurality of transfer requests, a transfer period comprising an interval of time between a transfer request and a subsequent transfer request, the image data being generated based on a predetermined frame rate, the frame rate determining an amount of image data to be generated in each transfer period,
- wherein the inverse of the frame rate corresponds to the transfer period;
- a power control unit that controls the camera module to transition to a photographing state and a low-power state in each transfer period; and
- an image processing unit that receives the image data from the camera module.

14. The computer of claim 13, wherein the interface is USB.

15. The computer of claim 13, wherein the computer is a battery-powered portable computer.

16. The computer of claim 15, wherein the camera module is attached to a housing of the portable computer.

17. The computer of claim 15, wherein the camera module is supplied with power from the computer.

18. A camera module capable of transferring dynamic image data to a host device, comprising:
- an optical mechanism that forms an image of a subject;
- an image sensor that converts light, by which the optical mechanism formed the image, to electric signals;
- an image signal processing circuit that processes output signals from the image sensor;
- an interface circuit for the host device; and
- a processor that controls the operation of the camera module;
- wherein the processor transfers the image data to the host device in response to receiving a transfer command of a plurality of transfer commands, wherein each transfer command of the plurality of transfer commands is issued at a predetermined transfer period of a plurality of transfer periods corresponding to the plurality of transfer commands, a transfer period comprising an interval of time between a transfer command and a subsequent transfer command, the image data being generated based on a predetermined frame rate, the frame rate determining an amount of image data to be generated in each transfer period, while transitioning the camera module between a photographing state and a low-power state in each transfer period, wherein the inverse of the frame rate corresponds to the transfer period.

19. The camera module of claim 18, wherein the camera module sets parameters of at least exposure time and white balance to parameter values acquired first when the camera module transitions to the photographing state.

20. The camera module of claim 18, wherein power consumption in the low-power state is about 10% or lower than power consumption in the photographing state.

21. A computer program product comprising a non-transitory computer readable storage medium storing computer usable program code executable to cause a camera module that includes an image sensor and is capable of outputting dynamic image data to a host device to implement the functions of:
- receiving a transfer command of a plurality of transfer commands for continuously transferring image data to the host device, wherein each transfer command of the plurality of transfer commands is issued at a predetermined transfer period of a plurality of transfer periods corresponding to the plurality of transfer commands, a transfer period comprising an interval of time between a transfer command and a subsequent transfer command;
- transitioning from a low-power state to a photographing state on the basis of the transfer command;

generating and outputting image data based on a predetermined frame rate, the frame rate determining an amount of image data to be generated in each transfer period, wherein the inverse of the frame rate corresponds to the transfer period;

transitioning to the low-power state after the completion of the output of the image data; and repeating the transition to the photographing state, the output of the image data, and the transition to the low-power state.

* * * * *